C. TWINING.
SWIVEL JOINT FOR ELECTRIC CONDUCTORS.
APPLICATION FILED JUNE 29, 1912.
1,070,307.
Patented Aug. 12, 1913.
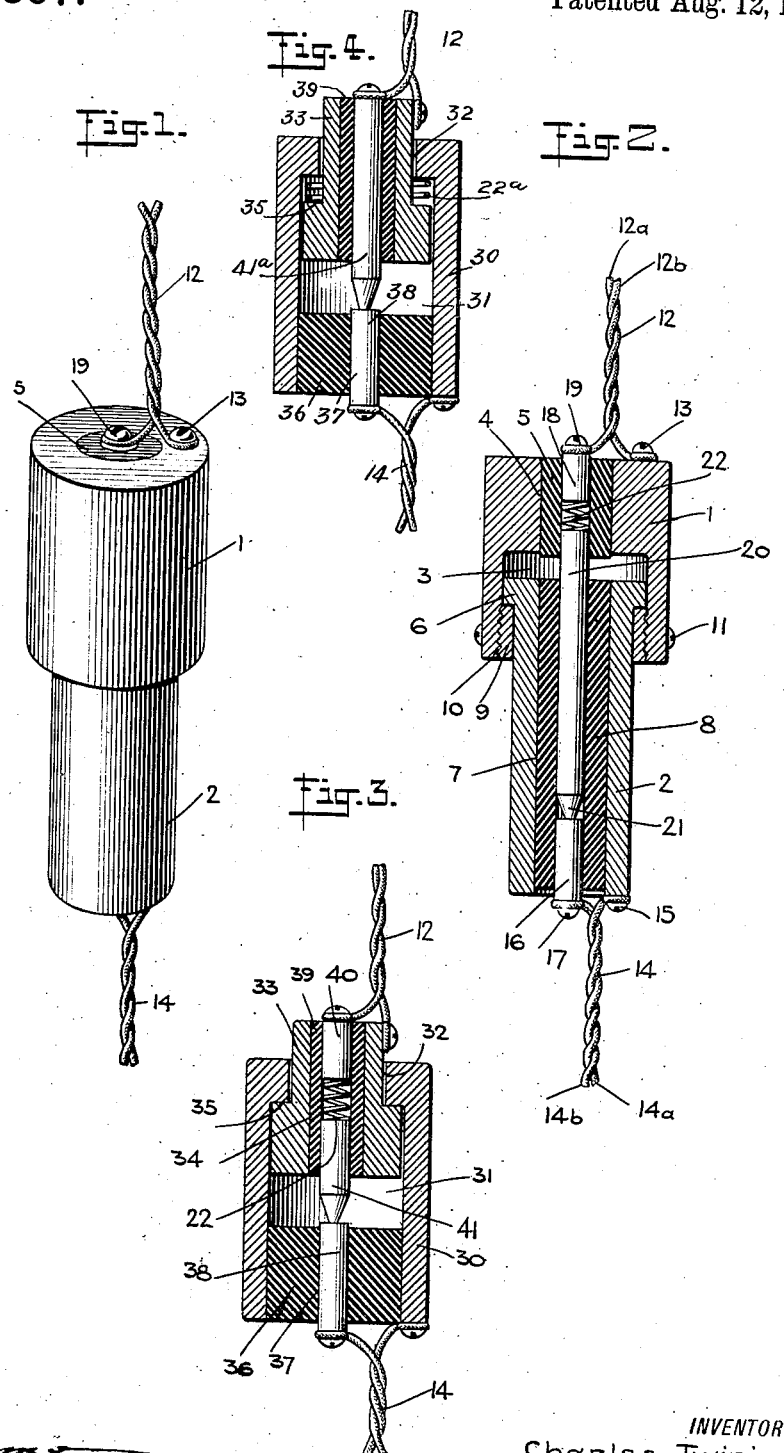
WITNESSES
INVENTOR
Charles Twining
BY
ATTORNEYS

UNITED STATES PATENT OFFICE.

CHARLES TWINING, OF LOCUST POINT, NEW JERSEY.

SWIVEL-JOINT FOR ELECTRIC CONDUCTORS.

1,070,307.  Specification of Letters Patent.  Patented Aug. 12, 1913.

Application filed June 29, 1912. Serial No. 706,593.

*To all whom it may concern:*

Be it known that I, CHARLES TWINING, a subject of the King of Great Britain, and a resident of Locust Point, in the county of Monmouth and State of New Jersey, have invented a new and Improved Swivel-Joint for Electric Conductors, of which the following is a full, clear, and exact description.

My invention relates to a new and improved swivel joint for electric conductors, the preferred embodiment of the invention being characterized by few parts, of simple construction, whereby the cost of production of such devices is lessened.

The principal object of my invention is to provide a swivel joint for connection to electric conductors, especially adapted to provide efficient means, whereby a portion of the conductor may be turned relatively to the other without entanglement.

It is of some importance in the production of devices of this class that the construction efficiently perform the purpose for which it was intended, and such fact has been borne in mind.

Reference is to be had to the accompanying drawings, forming part of this specification, in which similar characters of reference denote corresponding parts in all the views, and in which—

Figure 1 is a perspective view of the swivel connected to electric conductors; Fig. 2 is a vertical sectional view thereof; Fig. 3 is a similar view of a modified form; Fig. 4 is a vertical sectional view of a further modification.

The device includes the counterbored body member 1 and the shouldered and bored cylindrical member 2; the particular size and form of these parts, as well as the material of which they are made, being subject to variation as long as the resulting structure is capable of performance of the functions intended.

The body member 1, which is preferably, though not essentially, of cylindrical construction, contains a preferably circular recess 3, the member being counterbored at 4, the counterbored portion receiving an annular insulating element 5.

The cylindrical body member 2 has a shoulder 6 at one end thereof, the diameter of which is substantially equal to the diameter of the recess 3 in the member 1, this member 2 being longitudinally bored, as at 7, in order to receive an annular insulating element 8.

Referring particularly to Fig. 2 of the drawings, it will be noted that the shouldered end of the member 2 is entered into the recessed end of the member 1, the two members being capable of relative movement, withdrawal of the shouldered end from the recess being prevented through the medium of a ring 9, the inner diameter of which is substantially equal to the diameter of the member 2, the outer diameter of which is substantially equal to the diameter of the recess 3, the ring engaging the side wall of the recess, through the medium of screw threads 10. After the shouldered member 2 has been entered into the recess and the ring 9 has been placed in position, the parts may be held together in any suitable manner, preferably by means of screws or equivalent devices 11, which pass through the wall of the recess 3 into engagement with the said ring 9.

It will be noted that the conducting cord 12, shown in Fig. 2, is made up of two wires $12^a$, $12^b$, one of which, $12^b$, is in electrical connection with the body member 1 in any suitable manner, as by means of a set screw 13. On reference to this same figure it will be noted that the conducting cord 14 is made up of two wires $14^a$, $14^b$, one of which, $14^b$, is in electrical connection with the body member 2 in any suitable manner, preferably by means of a set screw 15, a consideration of the structure making clear the fact that the wire $14^b$ is in electrical connection with the wire $12^b$ because of the contact brought about by the shoulder 6 on the member 2 with the ring 9 carried by the member 1 or through contact with the side wall of the recess 3. It is essential, however, if the swiveling action is to be provided, that the member 2 turn relatively to the member 1, the wire $12^a$ at the same time being in electrical connection with the wire $14^a$. Positioned within the interior of the annular insulating element 8 is a plug 16 in electrical contact with the wire $14^a$ which is secured thereto by means of a set screw 17; contained within the annular insulating element 5 is a plug 18 in electrical connection with the wire $12^a$ by means of a set screw 19. Positioned within the major portion of the annular element 8 and extending upwardly into the annular element 5, is a rod 20, the lower end 21 of which is tapering and engages the said conducting plug 18, while the upper end of this rod bears against a helical spring 22, making contact with the said plug 18 and this said rod.

It is clear now that the body member 1 and the conductor 12 may be turned relatively to the body member 2 and the conductor 14 without entangling the conductors as when inserting a plug in the socket or when it is desired, under various circumstances, to turn some element in an electrical circuit relatively to the conductor in that same circuit.

The tension of the spring 22 is sufficient to maintain the shouldered end of the member 2 in good electrical contact with the ring 9, or the side wall of the recess 3, the spring at the same time serving to conduct the current from the plug 18 to the rod 20.

It is clear that various modifications of the particular arrangement of the parts shown in Fig. 2 will suggest themselves to those skilled in the art, such variations, however, not involving a substantial change in the inventive idea; in fact, in Fig. 3 I have set forth a modified form of the swivel embodying the same inventive idea as that set forth in Fig. 2. In this instance, the body member 30 is provided with a recess 31, the member being counterbored, as at 32. Within the recess 31 and extending through the counterbored portion or opening 32 is a shouldered body member 33 which has an opening 34 extending therethrough, the shoulder 35 of this body member engaging the bottom wall of the recess 31 in the member 30 so that it is evident that with the parts as shown in Fig. 3, and with the diameter of the opening 32 substantially equal to the diameter of the body member 33, that this body member cannot be withdrawn from the interior of the recess 31, save in one direction. In order to prevent withdrawal of this body member 33, the enlarged end of the recess 31 is closed by a suitable plug 36, preferably of insulating material, and having an opening 37 extending longitudinally thereof, into which a plug 38 is inserted; the wires of the conductor 14 are, in this instance, in electrical contact with the body member 30 and the plug 38.

Contained within the longitudinally extending opening 34 in the member 33 is a hollow cylindrical insulating element 39, carrying a plug 40 at its upper end, the wires of the conductor 12 being in electrical contact with the said plug 40, and the said body member 33. The engagement between the shoulder 35 and the side wall or the bottom wall of the recess 31 provides electrical contact between the members 30, 33, the plugs 38 and 40 being in electrical contact through the medium of a rod 41 similar to the one previously described and maintained in position in electrical contact through the medium of a helical spring 22 similar to the one shown in Fig. 2.

When the wires of the conductor 12 are secured in position, as shown, and the wires of the conductor 14 are also secured, either conductor may be turned or moved relatively to the other one without twisting or entangling the wires, the bottom wall of the recess 31 in the member 30 sliding over or relatively to the shoulder 35 carried by the body member 33.

It is clear that this relation of the parts among themselves may be changed without departing from the spirit of the invention, and in Fig. 4 one such departure is shown. The body member 30 is provided with the recess 31 and the counterbored portion 32 similar to what has been described; the open end of the body member is provided with the usual insulation 36 in which is contained the conducting plug 38. The body member 33 is shouldered, as at 35, and contains a single longitudinally extending conducting plug 41$^a$ positioned within the insulating material 39 carried by this body member. In this instance the contact between the plugs 30, 38, and 41$^a$ is maintained by means of the helical spring 22$^a$ contained within the recess 31 in the member 30 at the bottom thereof and bearing against such bottom and also the shoulder 35 of the relatively movable body member 33. It is clear that the pressure of the spring 22$^a$ will maintain the lower end of the plug 41$^a$ in electrical contact with the plug 38, while the contacting portions of the body members 30, 33, will also serve to conduct the current, assisted by the spring 22$^a$ itself which is in engagement with these members.

It is evident that the parts of the swivel, especially the body members with the connecting screws carried thereby, may be suitably inclosed in an insulating jacket or casing; the covering for these members, in order to prevent short-circuiting through contact thereof with the ground, when grounded circuits are employed, may also consist of some material applied to the outside of the body members in place of the jackets or casings previously mentioned.

While I have shown the preferred form of my device and modifications thereof in the drawings, it is, of course, clear that changes in such structures lying within the terms of the appended claims are included within the inventive idea disclosed.

Having thus described my invention, I claim as new, and desire to secure by Letters Patent:—

1. The combination of a counterbored body member and a shouldered body member, the shouldered portion of one engaging in the recessed portion of the other, means for maintaining such engagement and insulated elements in electrical contact with each other extending through the said body members, whereby the body members and the insulated members form independent conductors.

2. The combination of a counterbored body member and a shouldered body member, the shouldered portion of the one engaging in the recessed portion of the other and being movable therein, means for maintaining the parts in engagement, the body members being in electrical contact with each other, an insulating element carried in the counterbored portion of the first member, an insulating element carried by the second member, and conducting elements positioned within the insulating elements and in contact with each other, whereby they form a conductor.

3. The combination of a counterbored body member, an insulating element positioned in the counterbored portion, a conducting element within the insulating element, a shouldered element, the shouldered portion of the said element being positioned within the recess of the first element, and in contact therewith, means for maintaining the said portion in such recess, an insulating element carried by the said second body member, a conducting element carried by the insulating element, and a spring-pressed conductor between the conductors in the said insulating elements, whereby the said body members are adapted to conduct a current and the said conducting elements are also adapted to conduct current one to the other, through the said spring-pressed conductor.

4. The combination of a body member having a recess therein, the body member being counterbored at the bottom of the recess, an insulating element contained in the counterbored portion, a conducting element within the insulating element, a second body member, the said second body member being provided with a longitudinally extending bore, an insulating element contained within the said bore, a conducting element within the insulating element, the said second body member being provided with a shoulder adjacent one end, the shoulder being positioned within the recess of the first element, and a spring-pressed rod serving to conduct the current from one conducting element to the other, which elements are contained in the insulating elements.

5. A swivel comprising two body members in electrical contact with each other, one of the body members being movable relatively to the other, insulated elements carried by the body members, conducting elements carried by the insulating elements, and a spring-pressed rod adapted to convey current from one conducting element to the other, whereby the said swivel may be placed in position in an electric circuit.

In testimony whereof I have signed my name to this specification in the presence of two subscribing witnesses.

CHARLES TWINING.

Witnesses:
 CHAS. E. DOSCHER,
 A. M. ELFERS.